UNITED STATES PATENT OFFICE.

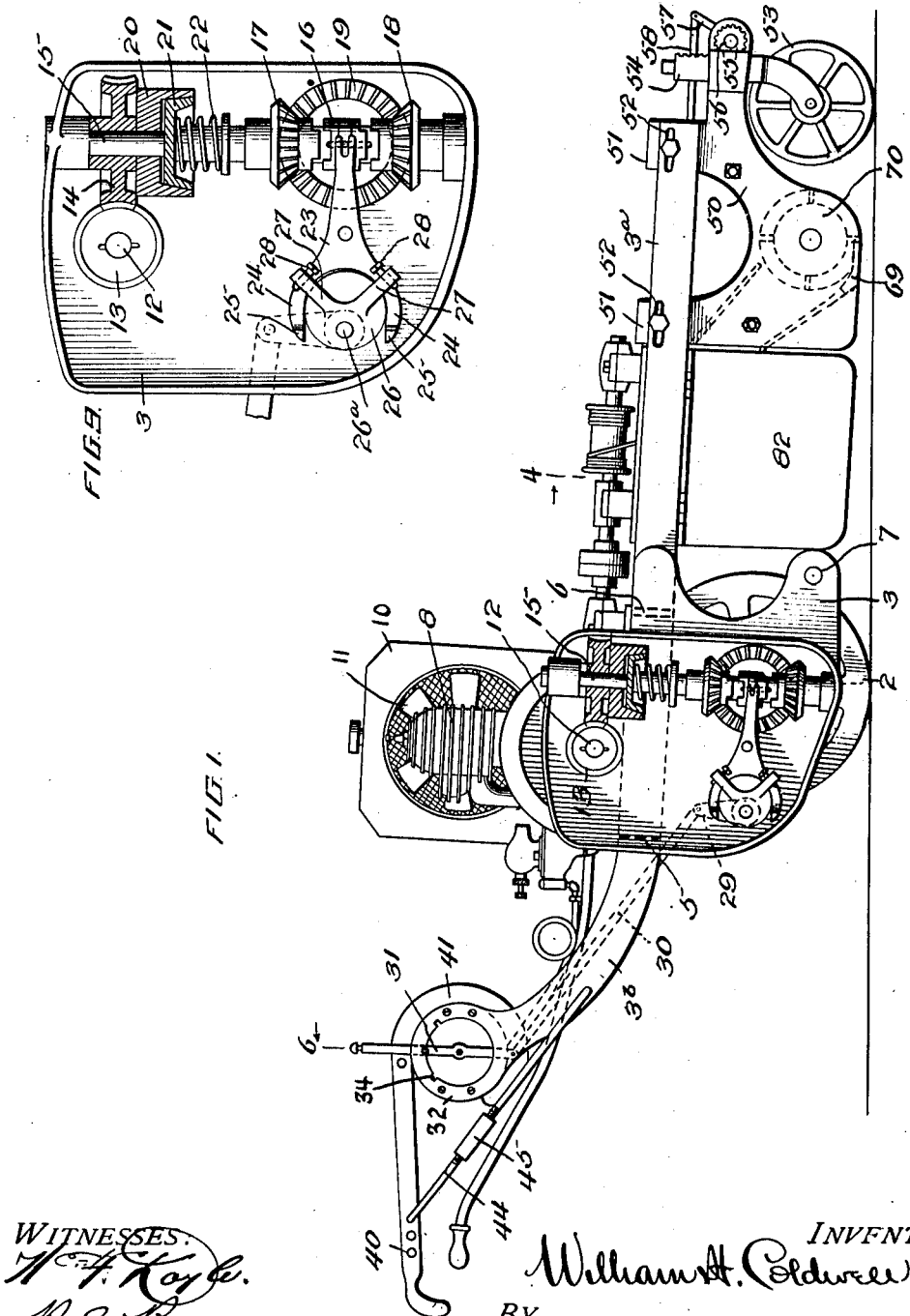

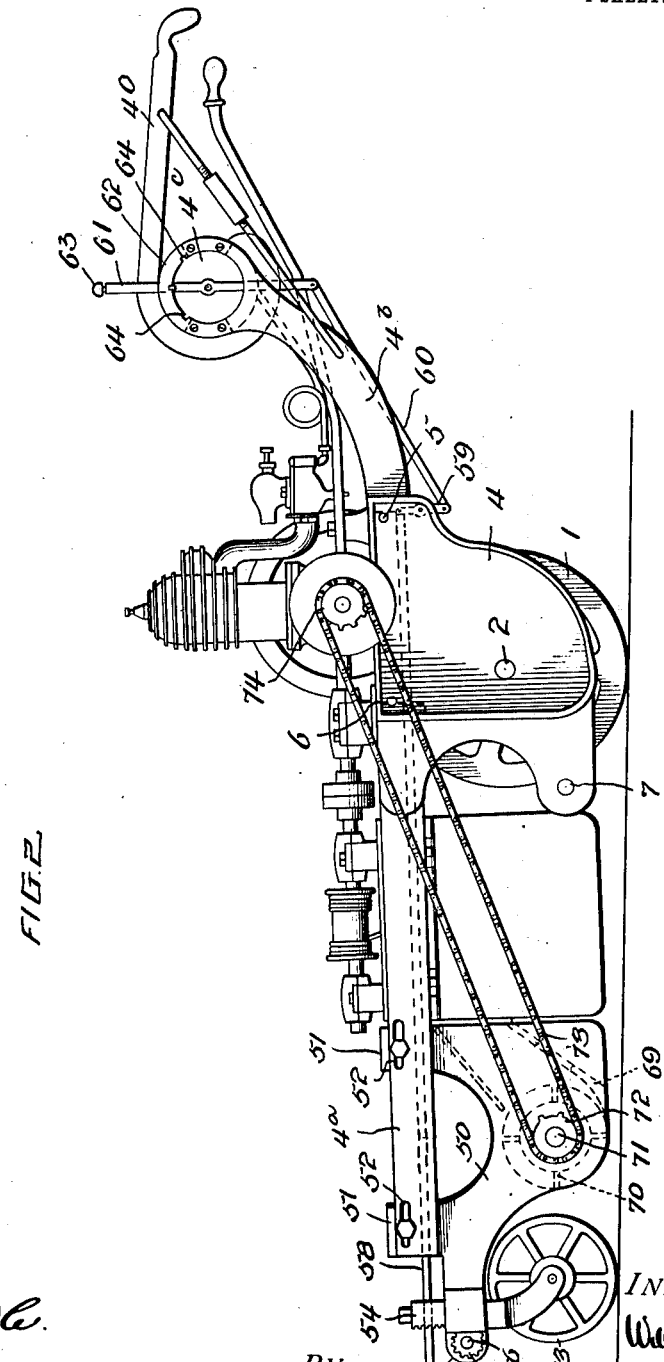

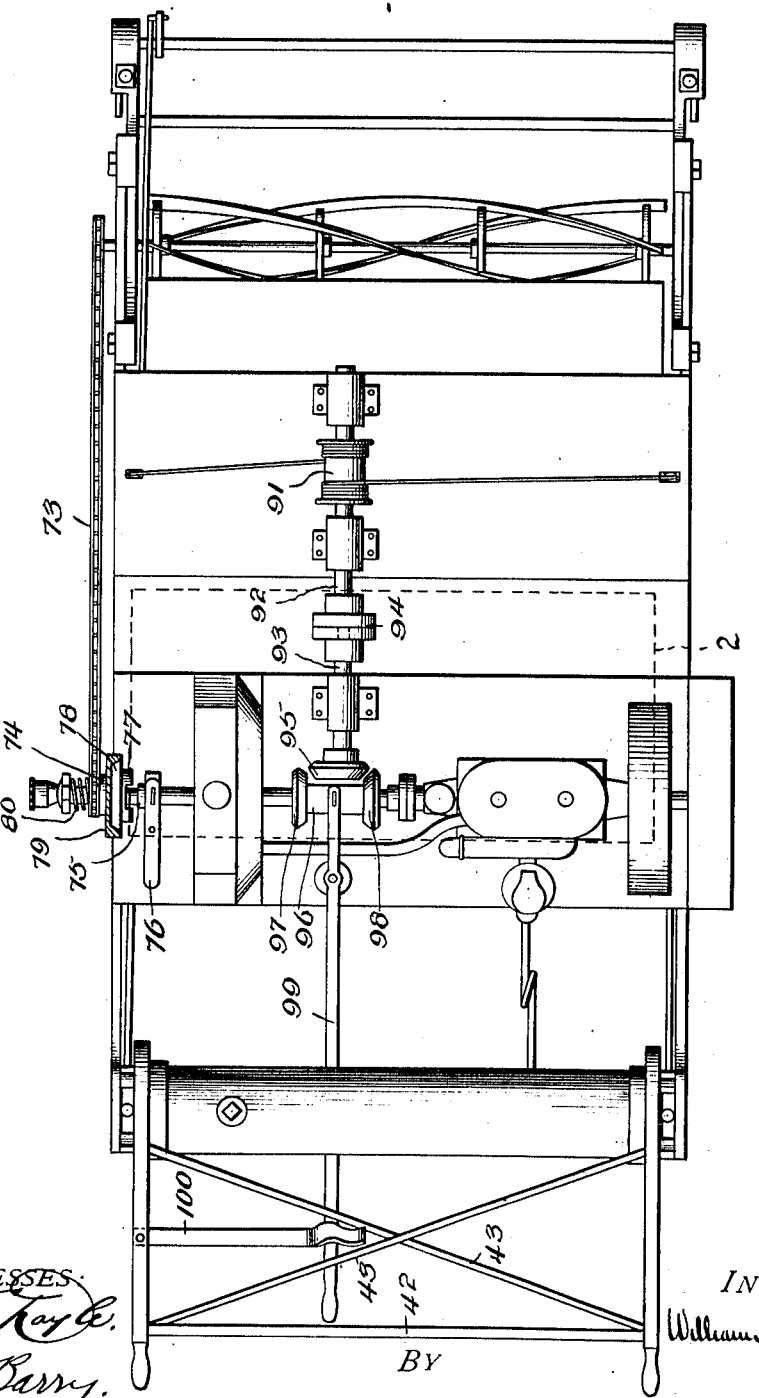

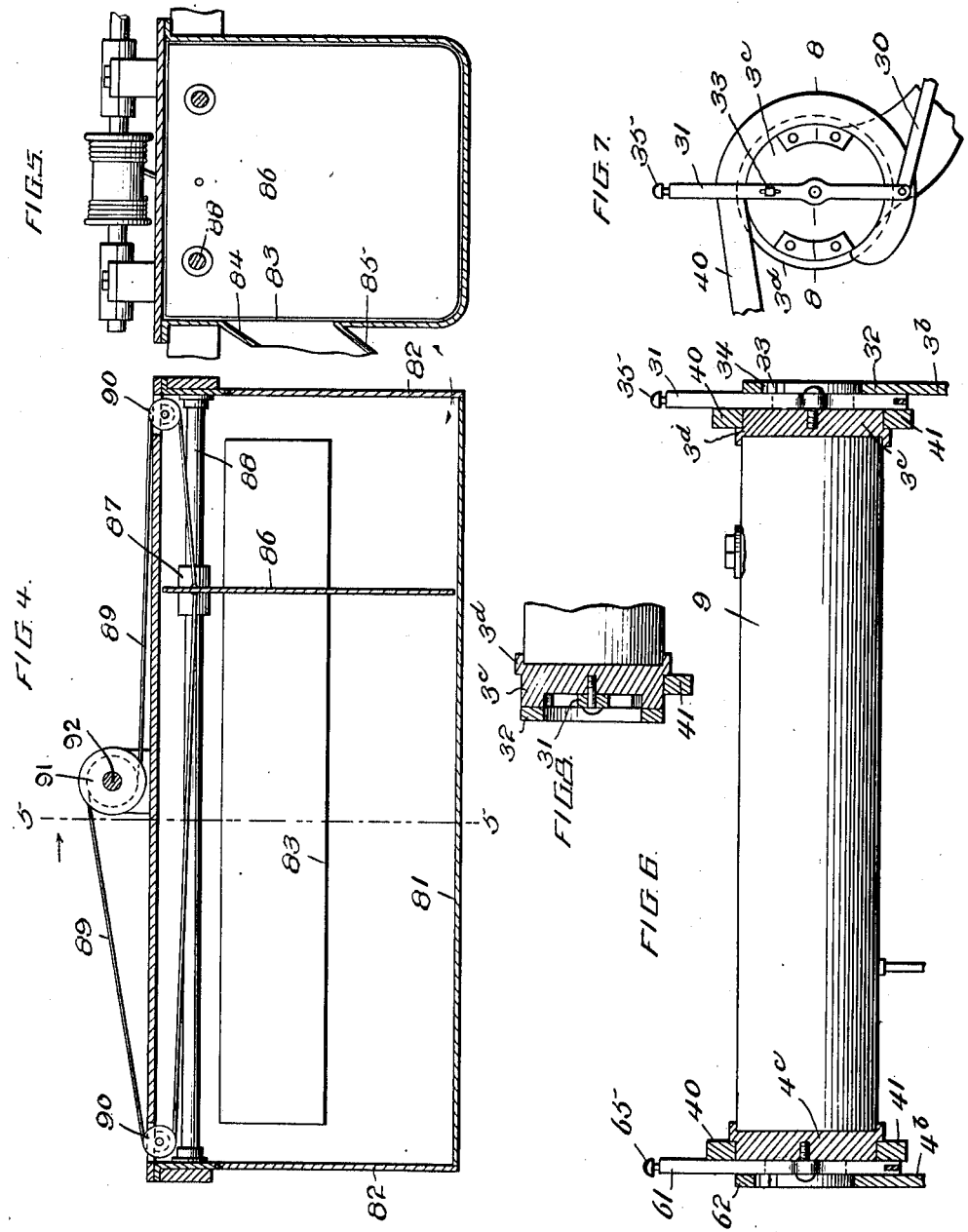

WILLIAM H. COLDWELL, OF NEWBURGH, NEW YORK.

MOTOR LAWN-MOWER.

1,048,498.  Specification of Letters Patent.  Patented Dec. 31, 1912.

Application filed February 14, 1911. Serial No. 608,547.

*To all whom it may concern:*

Be it known that I, WILLIAM H. COLDWELL, citizen of the United States, residing at Newburgh, in the county of Orange and State of New York, have invented certain new and useful Improvements in Motor Lawn-Mowers; and I do hereby declare the following to be a full, clear, and exact description of the invention, such as will enable others skilled in the art to which it appertains to make and use the same.

My invention consists in the novel features hereinafter described, reference being had to the accompanying drawings which illustrate an embodiment of the invention which I have selected for purposes of illustration and the invention is fully disclosed in the following description and claims.

Referring to the said drawings, Figure 1 represents a right side elevation of a motor lawn mower embodying my invention with the cover plate for the gear casing removed. Fig. 2 is a left side elevation of the same. Fig. 3 is a top plan view of the machine. Fig. 4 is a transverse sectional view of the machine through the grass collecting box taken on line 4—4 of Fig. 1. Fig. 5 is a sectional view of the grass box taken on a line 5—5 of Fig. 4 extending longitudinally of the machine. Fig. 6 is a detail view partly in section on line 6—6 of Fig. 1 of the gasolene supply tank and the portions of the handle structure adjacent thereto. Fig. 7 is a detail view of a portion of the handle structure. Fig. 8 is a section on line 8—8, Fig. 7. Fig. 9 is an enlarged view of the gear casing of the main frame with the closing plate removed.

The object of my invention is to provide a grass receptacle for lawn mowers and means in connection therewith for expelling the accumulated cut grass at intervals, and to provide means whereby the grass receptacle can be readily connected to and disconnected from the mower, and to provide means, where the grass receptacle is used in connection with a motor lawn mower, whereby the expelling or discharging mechanism can be operated by the motor thereof.

The embodiment of my invention which I have selected to illustrate my invention and which is shown and described herein is a motor lawn mower of my own invention and the features of said machine not herein claimed are reserved by me, and will form the subject matter of another application for patent.

In the drawings which show an embodiment of the invention selected by me for purposes of illustration, 1 represents a combined traction and lawn rolling roller, which may be made in one section but which is preferably made in two sections, to facilitate turning the machine, said roller being adapted to sustain practically the entire weight of the machine including the frame carrying the cutting mechanism, as hereinafter set forth.

Upon the axle 2 of the roller 1 is mounted the main or motor carrying frame, comprising the side plates 3, 4 each having forward horizontal extensions or bars $3^a$, $4^a$ and rearward upwardly curved extensions or bars $3^b$, $4^b$, the said side frames being connected by suitable transverse bars as 5, 6 and 7 to form a strong and rigid frame. The bars J and 6 are indicated in dotted lines in Fig. 1. The side plates 3 and 4 are provided with suitable bearings which engage the main shaft or axle 2 of the roller 1, and the roller sections (of which there may be any desired number) are mounted on said axle, and connected thereto by means of the well known differential gearing, or the equally well known pawl and ratchet wheel mechanism by means of which one section may be rotated at greater speed than another or the other, in turning the machine.

Upon the main frame is mounted a suitable motor, and I prefer to provide an internal combustion engine 8, having a radiator 10 and fan 11 connected with the water jacketed portions of the engine in the usual manner. The side plate 3 is preferably provided with a marginal flange forming a gear casing to contain the driving connections for the roller, which casing is closed by a cover plate (not shown) secured in position by suitable screws or bolts so that the case may be filled with grease or oil to insure proper lubrication of the gearing.

12 is the engine shaft which extends into the gear case and is provided with a worm 13 meshing with a worm wheel 14, loosely mounted on a vertical shaft 15, mounted in bearings in the gear casing and provided with oppositely disposed bevel pinions 17 and 18 loosely mounted to the shaft, and engaging a bevel gear 19 on the main shaft or axle 2 of the roller. Each of the said pinions is provided with a clutch member, to engage one of the clutch members of a double clutch 16, mounted to slide on a key or spline on the shaft 15. In order to relieve the mechanism from undue shock when the roller is connected with the motor, I prefer to interpose a friction device between the worm wheel 14 and the shaft 15. In this instance the worm wheel 14 is provided with a female friction clutch member 20, secured thereto and provided with an internal conical friction surface engaged by a conical male clutch member 21, secured to the shaft by a key or spline and movable longitudinally thereof, the two friction members being normally held in engagement by a spring 22. When the motor is thrown into gear with the roller, this friction clutch permits a slight slip if necessary in starting the roller, and as soon as the roller has acquired the desired amount of motion imparted by the gearing the clutch will hold and the roller will be continuously driven until the motor is disconnected.

23 represents a shifting lever pivoted to the side plate 3, and having one end in operative engagement with the double clutch 16, the other end being provided with two curved arms 24, 24 each having near its extremity a stop lug 25.

26 represents an eccentric mounted on a rock shaft 26$^a$ journaled in the side plate 3 and located between the arms 24, 24 and said eccentric is also provided with arms or projections 27, 27 each of which carries an adjustable stop, in the form of a set screw 28, adapted to engage the stops 25 and arrest the eccentric when the double clutch has been moved into firm engagement with the clutch member of either of said pinions 17, 18. When the eccentric is moved in one direction the arms 24, 24 are depressed and the double clutch is raised so as to bring its upper clutch member into engagement with the clutch member on the pinion 17, which will cause the roller 1 to be driven in one direction. By moving the eccentric in the reverse direction the arms 24, 24 are raised, thus depressing the double clutch 16 and engaging its lower clutch member with the clutch member on pinion 18, which will cause the roller 1 to be driven in the opposite direction. When the eccentric is in its median position, the shaft 15 and the double clutch rotate without driving the roller 1. The rock shaft 26$^a$ is provided with an operating arm 29 connected by a link 30, with a pivoted hand lever 31, mounted upon the rear end of the rearward extension 3$^b$ of the main frame, adjacent to a ring or segment 32, provided with three locking notches 34. The lever 31 is provided with a pawl 33 for engaging said notches, and with a spring actuated rod 35 extending through a hollow portion of the hand lever in a well known way and connected with said pawl for releasing the same. When the lever 31 is in its central position the eccentric 26 and double clutch 16 are in their neutral positions, and said lever may be moved forward or backward to operate the double clutch as before described, so as to drive the roller forward or backward as desired.

In practice I prefer to provide the rear end of the rearward extensions 3$^b$ with a ring shaped part forming the locking segment, and to secure thereto a circular casting 3$^c$ which is bolted thereto and provided with a recessed portion in which the hand lever is pivoted as shown in Figs. 6, 7 and 8. The inner face of the casting 3$^c$ is provided with a recessed portion to receive one end of a gasolene tank 9 (see Fig. 6) and the periphery of the casting 3$^c$ is provided with an annular flange 3$^d$. The extension 4$^b$ is similarly formed with a circular portion 62 provided on its upper portion with locking notches 64 to form a locking segment, and a similar casting 4$^c$ provided with an exterior flange 4$^d$, and a recess to receive the other end of the gasolene tank 9, is bolted to the part 62.

40, 40 represent handles each having a curved portion 41 extending more than half way around and loosely engaging one of the castings 3$^c$, 4$^c$ and forming thus pivotal connections for said handles. The handles are rigidly connected by a cross rod 42, and diagonal braces 43, which hold the parts 41 in engagement with the flanges 3$^d$, 4$^d$ of said castings and prevent lateral movement of the handles. The handles are maintained adjustably in the desired position by links 44, connected thereto and to the extensions 3$^b$, 4$^b$, said links being each made in two parts the adjacent ends being reversely threaded and connected by a reversely threaded sleeve 45. By adjusting the sleeves 45 the handles 40 can be raised or lowered to suit different operators, as will be readily understood. The tank 9 is connected by a suitable pipe with the carbureter of the motor, and being located so far in rear of the axis of the roller, its weight tends to exert a lifting force on the front part of the machine as hereinafter described.

Between the forward extensions 3$^a$, 4$^a$ of the main frame is secured a mower frame 50 comprising side plates connected by suitable cross bars. The sides of each of the plates are provided with upwardly extending projections terminating in lateral projections 51 which rest upon the adjacent extensions 3$^a$ or 4$^a$, and the frame 50 is rigidly secured to said extensions by suitable screws or bolts engaging slots 52, 52 in said extensions, so that the frame 50 can be adjusted toward and from the roller 1 for the purpose of securing the desired adjustment of the weight, and also for the purpose of tightening the chain which drives the rotary cutter. The forward end of the mower frame 50 is provided with caster wheels 53 the shanks of which are pivotally mounted in blocks 54 adapted to slide vertically in guides provided at the forward ends of the side plates of the mower frame, said blocks being each provided with a rack on its front face engaged by a pinion 55 on a shaft 56, extending across the frame 50 and journaled therein. The shaft 56 is provided with an operating arm 57 which is connected by a link or rod 58 to one end of a lever 59 pivoted centrally at the rear end of the side plate 4 of the motor frame, and a second link 60 connects the other end of lever 59 with a hand lever 61, pivoted to the casting 4ᶜ adjacent to the ring portion 62 of the rear extension 4ᵇ, which is provided with locking notches 64. The hand lever 61 is provided with a locking pawl 63 and spring actuated releasing rod 65 in like manner as the hand lever 31. By means of the hand lever 61 the shaft 56 can be rocked to raise and lower the mower frame and front end of the motor frame and thereby regulate the height of cut and also lift the cutting devices well above the ground when desired, as in moving the machine from place to place without cutting, or when it is desired to use it as a roller merely.

The motor frame is provided with cutting mechanism consisting in this instance of a stationary knife 69 and with a rotary cutter 70, the shaft 71 of which is provided with a sprocket wheel 72 connected by a chain 73 with a sprocket 74 on the motor shaft 12, (or a shaft driven therefrom) and I prefer to provide a friction device between the motor and the rotary cutter to prevent injury to the mechanism is case of the sudden stopping of the cutter. In this instance I have shown the motor shaft provided with a positive clutch member 75 (see Fig. 3) movable longitudinally of but turning with the shaft and operable by a clutch lever 76 into and out of engagement with a clutch member 77 to which is secured a friction cone 78, engaging a female friction member 79 secured to the sprocket wheel 74, the friction members being held in engagement by a spring 80.

I also prefer to provide the machine with a grass catching device, so constructed as to be readily detachable, and which in the embodiment of the invention here illustrated, is constructed as follows: 81 represents a metallic receptacle provided with top, bottom and front and rear walls, and having a hinged door 82 at one or both ends. I have shown it provided with a hinged door at each end so that the cut grass may be delivered at either side. The receptacle is so constructed that it can be dropped between the forward extensions 3ª, 4ª of the main frame, and be supported in position by projecting portions at each end which rest upon the said extensions, to which the receptacle may be detachably secured in any desired manner. The front wall of the receptacle is provided with a receiving aperture 83, and with inclined deflectors 84, 85 adjacent thereto for guiding the cut grass from the rotary cutter into the receptacle. Within the receptacle is a transversely movable expelling plate 86, mounted on suitable transverse guides secured to the receptacle. In this instance said plate is secured to sleeves 87 provided with ball bearings engaging cylindrical guide rods 88. Flexible connections 89, 89 are connected to the plate 86 and extend in opposite directions therefrom around pulleys 90, 90 mounted on the receptacle and thence to a drum 91 upon which they are reversely wound. The drum is mounted on a shaft 92, in alinement with a shaft 93 mounted on the motor frame, and said shafts are connected by any desired form of readily detachable shaft coupling 94, which in this instance comprises two disks secured to the meeting ends of the shafts, the one disk provided with projections adapted to fit into recesses in the other disk. By this means the grass box or receptacle can be removed very readily from the machine if desired. The shaft 93 is provided with a beveled friction wheel 95 and the engine shaft is provided with a longitudinally movable sleeve 96 keyed thereto, carrying two mounted bevel friction wheels 97, 98, for engaging the wheel 95 when it is desired to move the expelling plate in either direction. 99 represents a shifting lever pivoted to the motor frame, connected to said sleeve 96 at one end, and having its other end extending rearward to a point within easy reach of the operator. By throwing said lever in one direction or the other, it is obvious that the expelling plate can be caused to move in either direction from one end of the receptacle to the other, and the cut grass will be expelled with considerable force, one of the swinging doors opening by the pressure of the cut grass on the side toward which the expelling plate is moved. Any suitable means may be provided to hold the lever 99 normally in its median position for example, a spring latch 100, as shown in Fig. 3.

When the machine is operated, the torque of the motor in driving the roller 1 will produce a reaction upon the motor frame which tends to lift the front portion thereof. In practice I adjust the weight of the machine with respect to the axis of the roller, so that there is comparatively little weight upon the caster wheels 53 and when the machine is in operation the torque of the engine will tend to lift the front of the machine so as to transfer nearly all the weight of the machine to the roller 1, and almost raise the caster wheels from the ground. By this means the caster wheels are prevented from marking or indenting the lawn, which is a very desirable feature in motor lawn mowers, and the weight being so nearly balanced over the axle of the roller 1, the operator can lift the caster wheels entirely from the ground, by depressing the handles, if desired, as in turning the machine, or rolling soft ground or lawns or in rolling a flat surface like a tennis court where any impression of the caster wheels would be objectionable. The caster wheels thus serve merely the purpose of regulating the height of cut, and to that end must be in light but positive engagement with the ground when grass is being cut.

The mower frame is readily detachable from the main frame by simply removing the screws which engage the slots 52, and if desired the mower frame can be removed and a similar frame provided with a rotary brush in place of the rotary cutter, can be attached, and the brush operated by means of the chain 13, to sweep the surface traversed if desired.

What I claim and desire to secure by Letters Patent is:—

1. In a motor lawn mower, the combination with a receptacle for receiving the cut grass, of means for discharging the contents of said receptacle at a single movement thereof, said means being normally out of operation, while the machine is in operation, actuating devices for operating said discharging means, and restoring the same to normal position, and means for connecting said actuating devices with a moving part of the machine.

2. In a motor lawn mower, the combination with a receptacle for the cut grass, of an expelling device normally stationary during the operation of the machine for discharging the contents of said receptacle at a single movement thereof, actuating devices for said expelling device and means for connecting said actuating devices with the motor of the machine.

3. In a motor lawn mower, the combination with a receptacle for the cut grass, provided with a discharge aperture, a movable closure for said aperture, an expelling device normally stationary during the operation of the machine for discharging the contents of said receptacle, actuating devices for moving said expelling device toward and from the said discharge aperture and closure, and means for throwing said actuating devices into and out of engagement with the motor.

4. In a motor lawn mower, the combination with a receptacle for cut grass, provided with a discharge aperture and a hinged closure for said aperture, an expelling device normally stationary during the operation of the machine for discharging the contents of said receptacle, actuating devices for moving said expelling device toward and from said hinged closure, and means for throwing said actuating devices into and out of operative connection with the motor.

5. In a motor lawn mower, the combination with a receptacle for cut grass, provided with a discharge aperture adjacent to one side of the machine, a movable closure for said discharge aperture, an expelling device normally stationary during the operation of the machine in said receptacle movable transversely of the machine, toward and from the said discharge aperture, actuating devices for moving said expelling device in both directions transversely of the machine, and means for throwing said actuating devices into and out of operative relation with the motor.

6. In a lawn mower, the combination with a receptacle for cut grass, provided with a discharge aperture, of an expelling device normally stationary during the operation of the machine, located within said receptacle for discharging the contents thereof by a single movement and actuating mechanism for moving said expelling device toward the discharge aperture and restoring it to its original position.

7. In a lawn mower, the combination with a receptacle for cut grass, provided with a discharge aperture at one side of the machine, of an expelling device normally stationary during the operation of the machine, movable transversely of the machine and actuating devices for moving said expelling device in both directions transversely of the machine, toward and from said discharge aperture.

8. In a motor lawn mower, the combination with a receptacle for cut grass provided with a discharge aperture adjacent to one side of the machine, expelling device normally stationary during the operation of the machine, located in said receptacle, stationary guides extending transversely of the machine for engaging and supporting said expelling device, actuating devices for moving said expelling device along said guides in both directions and means for connecting the actuating devices with the motor.

9. In a motor lawn mower, the combination with a receptacle for cut grass provided with a discharge aperture adjacent to one side of the machine, expelling device normally stationary during the operation of the machine, located in said receptacle, guides extending transversely of the machine for engaging and supporting said expelling device, a winding drum, flexible connections connected with said expelling device and reversely wound on said drum, and driving means for said drum.

10. In a motor lawn mower, the combination with a receptacle for cut grass provided with a discharge aperture adjacent to one side of the machine, an expelling device normally stationary during the operation of the machine, located in said receptacle, guides extending transversely of the machine for engaging and supporting said expelling device, a winding drum, flexible connections connected with said expelling device and reversely wound on said drum, frictional devices for driving said drum in both directions, and means for throwing said frictional devices into and out of operation.

11. In a motor lawn mower, the combination with a cut grass receptacle, disposed transversely of the machine, and provided with a discharge aperture adjacent to each side of the machine, of an expelling device located in said receptacle, means for reciprocating said expelling device transversely of the machine to deliver the cut grass from either of said apertures, said expelling device being movable in a horizontal direction only and means for throwing said reciprocating means into and out of engagement with the motor.

12. In a motor lawn mower, the combination with a grass receptacle disposed transversely of the machine and provided with a discharge aperture at one side of the machine, a receptacle expelling device capable of movement from one end of said receptacle to the other, said expelling device being movable in a horizontal direction only and operative connections from the motor to said expelling device.

13. In a motor lawn mower, the combination with a traction roller, a main frame carried thereby, a motor mounted on the main frame, a mower frame rigidly secured to the main frame in advance of the said roller and provided with ground engaging devices for maintaining a uniform height of cut, cutting mechanism carried by said mower frame, connections between the motor and said roller, connections between the motor and said cutting mechanism, a grass receptacle carried by said main frame in rear of the cutting mechanism disposed transversely of the said frame and having a delivery aperture at one end of the same, an expelling device normally stationary during the operation of the machine in said receptacle, actuating mechanism for moving said expelling device from either end of the receptacle to the other end thereof, and devices for throwing said actuating mechanism into and out of operative relation with the motor.

14. In a motor lawn mower, the combination with the main frame, a traction roller connected therewith, a mower frame connected with the main frame and provided with rotary ground engaging devices for regulating the height of cut, cutting mechanism carried by the mower frame, connections from the motor to the said roller and to said cutting mechanism, a detachable grass receptacle removably secured to the main frame and provided with a discharge aperture, an expelling device normally stationary during the operation of the machine in said receptacle for discharging the contents of said receptacle at a single movement and means for moving said expelling device toward the delivery aperture and returning it to its normal position.

15. In a motor lawn mower, the combination with the main frame, a traction roller connected therewith, a mower frame connected with the main frame and provided with rotary ground engaging devices for regulating the height of cut, cutting mechanism carried by the mower frame, connections from the motor to the said roller and to said cutting mechanism, a detachable grass receptacle removably secured to the main frame and provided with a discharge aperture, an expelling device normally stationary during the operation of the machine in said receptacle, for discharging the contents of said receptacle at a single operation thereof, connections between the motor and said expelling device, said connections being readily disconnectible from the machine at some point between the motor and the expelling device to facilitate the removal of the grass receptacle, and a hand operated controlling device for said connections.

16. In a motor lawn mower, the combination with the main frame, a traction roller connected therewith, a mower frame connected with the main frame and provided with rotary ground engaging devices for regulating the height of cut, cutting mechanism carried by the mower frame, connections from the motor to the said roller and to said cutting mechanism, a detachable grass receptacle removably secured to the main frame and provided with a discharge aperture, an expelling device normally stationary during the operation of the machine in said receptacle, actuating mechanism, having a portion thereof mounted on the removable receptacle, for operating the expelling device, said portion of the actuating device being readily disconnectible from the machine, and means for throwing said actuating mechanism into and out of operative relation with the motor.

17. In a motor lawn mower, the combination with the main frame, a traction roller connected therewith, a mower frame connected with the main frame and provided with rotary ground engaging devices for regulating the height of cut, cutting mechanism carried by the mower frame, connections from the motor to the said roller and to said cutting mechanism, a detachable grass receptacle removably secured to the main frame and provided with a discharge aperture, expelling device normally stationary during the operation of the machine in said receptacle, devices mounted on the removable receptacle for operating said expelling device, detachable connections between said devices and a rotary part on the main frame, and means for throwing said rotary part on the main frame into and out of engagement with the motor.

18. In a motor lawn mower, the combination with the main frame, a traction roller connected therewith, a mower frame connected with the main frame and provided with rotary ground engaging devices for regulating the height of cut, cutting mechanism carried by the mower frame, connections from the motor to the said roller and to said cutting mechanism, a detachable grass receptacle removably secured to the main frame and provided with a discharge aperture, an expelling device during the operation of the machine in said receptacle, devices mounted on the removable receptacle for operating the said expelling device, friction gearing mounted on the main frame for driving said devices in either direction, a controlling device for said friction gearing and detachable connecting mechanism between said friction devices and the devices mounted on said receptacle.

19. In a motor lawn mower, the combination with the main frame, a traction roller connected therewith, a mower frame connected with the main frame and provided with rotary ground engaging devices for regulating the height of cut, cutting mechanism carried by the mower frame, connections from the motor to the said roller and to said cutting mechanism, a detachable grass receptacle removably secured to the main frame and provided with a discharge aperture, an expelling device during the operation of the machine in said receptacle, a winding drum mounted on said removable receptacle flexible connections from said drum to the expelling device for moving it in both directions, devices for driving said drum from the motor in either direction, and detachable connections between said driving devices and the drum.

20. In a motor lawn mower, the combination with the main frame provided with a traction roller, a mower frame connected with the main frame and provided with rotary ground engaging devices for regulating the height of cut and with cutting mechanism and driving mechanism therefor, of a detachable grass receptacle removably secured to the main frame and provided with a discharge aperture, an expelling device normally stationary during the operation of the machine, located in said receptacle, and movable toward and from the discharge aperture, a winding drum mounted on said receptacle, operatively connected with the expelling device, an operating shaft for said drum, mounted on the main frame in alinement with the axis of the drum and detachably connected to the drum, reversible driving gearing normally out of operative position, for connecting the motor with said operating shaft for driving the said shaft, and the drum in either direction and a controlling device for said reversing mechanism.

In testimony whereof I affix my signature, in the presence of two witnesses.

WILLIAM H. COLDWELL.

Witnesses:
J. K. MOORE,
R. E. BARRY.